United States Patent [19]
Dodds et al.

[11] Patent Number: 5,841,841
[45] Date of Patent: Nov. 24, 1998

[54] NETWORKING COMPUTERS VIA SHARED USE OF VOICE TELEPHONE LINES

[75] Inventors: David E. Dodds; Gregory J. Erker, both of Saskatoon, Canada

[73] Assignee: Telecommunications Research Laboratories, Edmonton, Canada

[21] Appl. No.: 913,439
[22] PCT Filed: Mar. 14, 1996
[86] PCT No.: PCT/CA96/00168
  § 371 Date: Nov. 17, 1997
  § 102(e) Date: Nov. 17, 1997
[87] PCT Pub. No.: WO96/29808
  PCT Pub. Date: Sep. 26, 1996
[51] Int. Cl.⁶ .................................................. H04M 11/00
[52] U.S. Cl. ................................... 379/93.08; 379/90.01; 370/488
[58] Field of Search .................. 379/90.01, 93.01–93.09, 379/93.14, 93.21, 93.28, 93.37, 110.01, 156–173, 387, 115, 116, 112; 370/445, 440, 480, 481, 488–497

[56] References Cited

U.S. PATENT DOCUMENTS

| | | |
|---|---|---|
| 4,534,039 | 8/1985 | Dodds et al. . |
| 4,670,874 | 6/1987 | Sato et al. . |
| 4,757,495 | 7/1988 | Decker et al. . |
| 4,785,448 | 11/1988 | Reichert et al. . |
| 4,799,213 | 1/1989 | Fitzgerald . |
| 4,901,342 | 2/1990 | Jones . |

FOREIGN PATENT DOCUMENTS

| | | |
|---|---|---|
| 0164244 | 12/1985 | European Pat. Off. . |
| 0266151 WOX | 5/1988 | European Pat. Off. . |
| 88/01116 | 1/1988 | WIPO . |
| WO 88/06821 | 9/1988 | WIPO . |
| WO 88/08364 | 9/1989 | WIPO . |

*Primary Examiner*—Wing F. Chan
*Attorney, Agent, or Firm*—Adrian D. Battison; Murray E. Thrift

[57] ABSTRACT

Simultaneous communication of data and voice on a common telephone line are provided between a customer location and a central switching location. At the customer location there may be provided a series of computers each having the LAN interface connected to a common data bus at the customer location with that bus connected to the telephone line. At the central switching station the telephone lines are connected to a central hub device which does not provide a data bus but connects to the Internet. High and low pass filters allow the data from the LAN interface from the voice from a telephone set to be communicated simultaneously on the common line. Equalization and pre distortion are provided to enhance transmission line distances.

12 Claims, 7 Drawing Sheets

NETWORKING COMPUTERS VIA SHARED USE OF VOICE TELEPHONE LINES

This invention relates to a method for transmitting data from a computer on a telephone line simultaneously with the transmission of voice communications on the same telephone line and to a coupling apparatus for connecting the computer and the voice communication set to the telephone line.

The invention relates to interconnection and networking of remote personal computers for the purpose of gaining access to a central computer file server and for access to the computer data internet. The term personal computer will be used to include a work station or other data terminal equipment with an interface for connection to a local area network (LAN). The disclosed interconnection method permits a single computer or a plurality of computers at a remote location to be connected to a central computer network using existing telephone wires which continue to provide the normal voice access to the public switched telephone network (PSTN). In contrast to voice band data modems and fax machines, the disclosed connection method permits simultaneous use of the data network and the voice network. Use of the telephone wires for data network access does not at any time preclude origination or reception of a voice call on the PSTN and, similarly, use of voice access to the PSTN does not preclude access to the data network. The functions of ringing, talking and dial pulse or tone signaling operate normally and simultaneously with data transmission. The disclosed data connection method allows the personal computer to be continuously connected to a data network rather than periodically connected on a "dial up" basis.

BACKGROUND OF THE INVENTION

Computer data networks which provide data paths among personal computers that are localized to a single building or a small group of physically close buildings are referred to as a local area network or LAN. Computer networks that are composed of an interconnected set of LANs within a somewhat larger area such as an industrial park, a university campus or a small community are typically referred to in the art as a metropolitan area networks or MAN. A computer network covering an interurban or regional area is referred to as a wide area network WAN while the interconnection of WANs at the global level is referred to as the Internet.

The prior art includes several examples of remote access to computer networks. The use of voice band modems for remote connection to a computer network has been commonplace for many years. Most common is dial up access which is temporary and prevents simultaneous use of the telephone line for voice service. The prior art also includes leased line service which necessitates a separate telephone line for data service in addition to the normal telephone line used for voice service. Both of the above mentioned access methods require a modem (modulator/demodulator), a relatively costly device which converts the data signal to a modulated voice frequency signal which is then suitable for transmission on the voice network. Voice frequency modems typically limit the data transmission speed to less than 30 kb/s and absolutely to less than 64 kb/s.

The prior art also includes short distance "data over voice" modems which modulate a sinusoidal carrier signal which has a frequency somewhat higher than the highest voice frequency signal. These systems provide continuous data access and permit simultaneous voice and data transmission on the telephone line between a voice station set and the voice switch. A frequency selective interface is used to prevent interference between the voice transmission and the data transmission. The transmission distance of these modems is typically less than 3.5 miles or 5.5 km. One example is the LDV-2 data over voice multiplexor manufactured by RAD Data Communications which has a range of 9 km at 9600 b/s. A second example is described in U.S. Pat. No. 4,670,874 (Sato) which discloses the use of a modem to generate modulated data signals on a sine wave carrier together with a filter system which acts to separate the data transmission from the voice signals so that these can be transmitted simultaneously on a common telephone line. The filter system shown by Sato is usable only in the modem arrangement shown which has in effect no transmitted energy from the data in the voice frequency range. These devices are relatively complicated and expensive and also have relatively low transmission rates.

The prior art also includes limited distance data transmission on paired copper wire without the use of the above mentioned modem. A first example is the Farralon PhoneNet device as shown in U.S. Pat. No. 4,901,342 (Jones) which connects the LAN interface of an Apple Macintosh® or other similarly configured LAN interface to a network of paired copper wire of a type which could otherwise be used for voice telephone service. The PhoneNet interface device is a passive unit and does not require a power supply. It couples LAN signals to the paired copper wire using a small transformer and therefore the paired copper wire cannot be used simultaneously for voice telephone service since the transformer would pass DC current and would make the telephone set appear "off-hook". Furthermore the low frequency components of the LAN signal which are at voice frequency would seriously disturb or degrade the voice communication.

A second example is the Develcon DS507 or RAD SRM-6D limited distance data set which connects the RS 232 port or RS 422 port of a computer terminal or personal computer to a similar, somewhat distant, device using paired copper wire which would otherwise be used for voice telephone service. The limited distance data set is an active electronic device which can be configured to draw supply power from the RS 232 signals of the said terminal or computer. This arrangement is shown in U.S. Pat. No. 4,534,039 (Dodds) and in the catalog of RAD Data Communications, Mahwah, N.J.

Related art includes ISDN (Integrated Services Digital Network) basic rate access which provides 144 kb/s bidirectional transmission using a telephone line with length less than 5.5 km. A digital voice station set is required at the customer location and transmission to the voice switch is in digital form. This arrangement can offer simultaneous voice and data transmission but requires a drastic modification to the conventional voice communication equipment and has therefore achieved modest success in the field.

Two proposals for communication of voice and data simultaneously, which do not appear to have achieved any commercial success, are disclosed in U.S. Pat. No. 4,985,892 (Camarata) and U.S. Pat. No. 4,785,448 (Reichert). Both of these patents disclose an arrangement in which a LAN is formed using common telephone lines to link user stations to a central station. Data in the form of binary signals is applied to the common telephone line simultaneously with voice communication. A data bus is provided at the central station for interconnection of the data from the common telephone lines. Thus the LAN uses the common lines and the bus for the only interconnection between the stations. Also the patents do not disclose the direct connection of data from the existing LAN interface of the computers to the telephone line at the standard 230 kb/sec LocalTalk interface of an Apple Macintosh computer. Yet further the patents do not disclose techniques for improving the data communication by which increased distances can be obtained.

U.S. Pat. No. 3,980,826 (Widmer) discloses a technique for predistorting digital signals for use in communication along a transmission line.

SUMMARY OF THE INVENTION

It is one object of the present invention to provide low cost high speed data service to remote personal computer users who already have telephone service.

According to a first aspect of the invention there is provided a method of transmitting data and voice communication simultaneously over a common telephone line from a computer at a remote location to a central location comprising: providing a computer at the remote location; providing on the computer a LAN interface for transmitting binary data signals directly to and receiving binary data signals directly from other similar computers; the binary data signals comprising a series of voltage elements representing "0" and "1" at a frequency of 230 kHz; connecting the LAN interface of the computer to the common telephone line such that the binary data signals therefrom are applied without modulation to the common telephone line; transmitting said binary data signals from the LAN interface onto the common telephone line for reception and reading at the central location; providing a voice telephone set at the remote location having terminals for receiving and transmitting voice communications in the form of a voltage varying at voice frequencies; connecting the terminals to the common telephone line; transmitting said voice communications to and from the voice telephone set on the common telephone line; providing a first filter between the LAN interface and the common telephone line; and causing the first filter to attenuate energy in said binary data signals lying in said voice frequencies to a level such that the energy does not interfere with the voice communications while allowing the binary data signals to be received and read at the remote location.

According to a second aspect of the invention there is provided a communication network for transmitting data and voice communication simultaneously over a common telephone line comprising: a central location; a plurality of customer locations; at least one computer at each customer location; a plurality of telephone lines each extending from the central location to a respective one of the customer locations; each computer having a LAN interface for transmitting binary data signals directly to and receiving binary data signals directly from other similar computers, the binary data signals comprising a series of voltage elements representing "0" and "1"; at least some of the customer locations each including a plurality of the computers and connection means interconnecting the LAN interface of the computers at the respective customer location such that communication of data between the computers is effected without communication through the central location; each customer location having at least one voice telephone set with terminals for receiving and transmitting voice communications in the form of a voltage varying at voice frequencies and at least some of the customer locations having more than one voice telephone set; each customer location having first connecting means connecting the LAN interface of each computer at the respective customer location to the respective common telephone line such that the binary data signals from the computer are applied without modulation to the respective common telephone line for transmitting said binary data signals from the LAN interface onto the respective common telephone line for reception and reading at the central location and such that binary data signals are received from the central location to the computer; said first connecting means including a first filter between the LAN interface and the respective common telephone line, the first filter being arranged to attenuate energy in said binary data signals lying in said voice frequencies to a level such that the energy does not interfere with the voice communications while allowing the binary data signals to be received and read at the central location; each customer location having second connecting means connecting the terminals of each telephone set at the respective customer location to the respective common telephone line for transmitting said voice communications to and from the voice telephone set on the respective common telephone line; said second connecting means including a second filter between the voice telephone set and the common telephone line, the second filter being arranged to attenuate energy in a range higher than said voice frequency so as to communicate from said common telephone line to said voice telephone set substantially only the voice communication frequencies; the central location including a voice switching system for receiving and switching voice communications and a central multiplexer hub device having a first connection to an international data network and a second multiplex connection to a plurality of ports, each of the common telephone lines being connected to a respective one of the ports and to the voice switching system; the central location including a third filter between each common telephone line and the voice switching system, the third filter being arranged to attenuate energy in said binary data signals lying in said voice frequencies to a level such that the energy does not interfere with the voice communications to the voice switching system and allows the voice communications to be received and read at the central location; the central location including a fourth filter between each common telephone line and the central hub device, the fourth filter being arranged to attenuate energy in said voice frequencies to a level such that the energy does not interfere with the binary data signals to the central hub device and allows the binary data signals to be received and read at the central hub device; the central hub device providing no direct connection between the common telephone lines such that each port is independently connected through the hub device to the international data network.

According to a third aspect of the invention there is provided a communication network for transmitting data and voice communication simultaneously over a common telephone line comprising: a central location; a plurality of customer locations; at least one computer at each customer location; a plurality of telephone lines each extending from the central location to a respective one of the customer locations; each computer having a LAN interface for transmitting binary data signals directly to and receiving binary data signals directly from other similar computers, the binary data signals comprising a series of voltage elements representing "0" and "1"; each customer location having at least one voice telephone set with terminals for receiving and transmitting voice communications in the form of a voltage varying at voice frequencies; each customer location having first connecting means connecting the LAN interface of each computer at the respective customer location to the respective common telephone line such that the binary data signals therefrom are applied without modulation to the respective common telephone line for transmitting said binary data signals from the LAN interface onto the respective common telephone line for reception and reading at the central location; said first connecting means including a first filter between the LAN interface and the respective common telephone line, the first filter being arranged to attenuate energy in said binary data signals lying in said voice frequencies to a level such that the energy does not interfere with the voice communications while allowing the binary data signals to be received and read at the central location; each customer location having second connecting means connecting the terminals of each telephone set at the respective customer location to the respective common telephone line for transmitting said voice communications to and from the voice telephone set on the respective common telephone line; said second connecting means including a second filter between the voice telephone set and the telephone line, the second filter being arranged to attenuate energy in a range higher than said voice frequency so as to communicate from said common telephone line to said voice telephone set substantially only the voice communication frequencies; the central location including a voice switching system for receiving and switching voice communications and a central multiplexer hub device having a first connection to a central computer network and a second multiplex connection to a plurality of ports, each of the common telephone lines being connected to a respective one of the ports and to the voice switching system; the central location including a third filter between each common telephone line and the voice switching system, the third filter being arranged to attenuate energy in said binary data signals lying in said voice frequencies to a level such that the energy does not interfere with the voice communications to the voice switching system and allows the voice communications to be received and read at the central location; the central location including a fourth filter between each common telephone line and the central hub device, the fourth filter being arranged to attenuate energy in said voice frequencies to a level such that the energy does not interfere with the binary data signals to the central hub device and allows the binary data signals to be received and read at the central hub device; the central hub device providing compensation for the frequency dependent attenuation of the common telephone line.

In its principal function, the method provides remote access to a computer network such as a local area network (LAN) a metropolitan area network (MAN) or an internet of such networks for the transport of computer files and keyboard control signals with each personal computer connecting to the network through its LAN interface and its associated software which produces an electric signal which transmits the information content of the computer data file or keyboard command signals and where the LAN interface is attached to the telephone line with a frequency selective coupler such that almost no voice frequency components of the data signals are coupled to the telephone line thereby avoiding interference with the existing voice communication functions.

Additional personal computers can be connected together to form a LAN at the remote site. A local area network (LAN) bus is formed on the existing telephone wiring and this telephone line is normally available through outlet jacks in several rooms at the remote location. Additional computers with appropriate filter units are simply plugged into existing outlet jacks to gain attachment to the LAN. Computers attaching to the common telephone line can therefore share files. It is not therefore necessary for the computers at the remote site to communicate through the central equipment.

In addition to the described equipment at the personal computer location, a similar interface is provided at a wire junction point located somewhere between the voice terminal equipment and the voice switching equipment and preferably spaced some distance from the switching equipment. The junction point could be located in a wiring closet of a large building, a pedestal, a jumper wire interface (JWI) point in residential wiring or the distributing frame of a private branch exchange (PBX) or a central office voice switch where a plurality of telephone lines and the associated plurality of frequency selective interfaces are each connected to a port on a central hub device which provides access to a central computer network and as a result, each telephone line, while still being used for voice communication is also used to extend the central computer network over a distance of one or two kilometers to remotely located personal computers.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
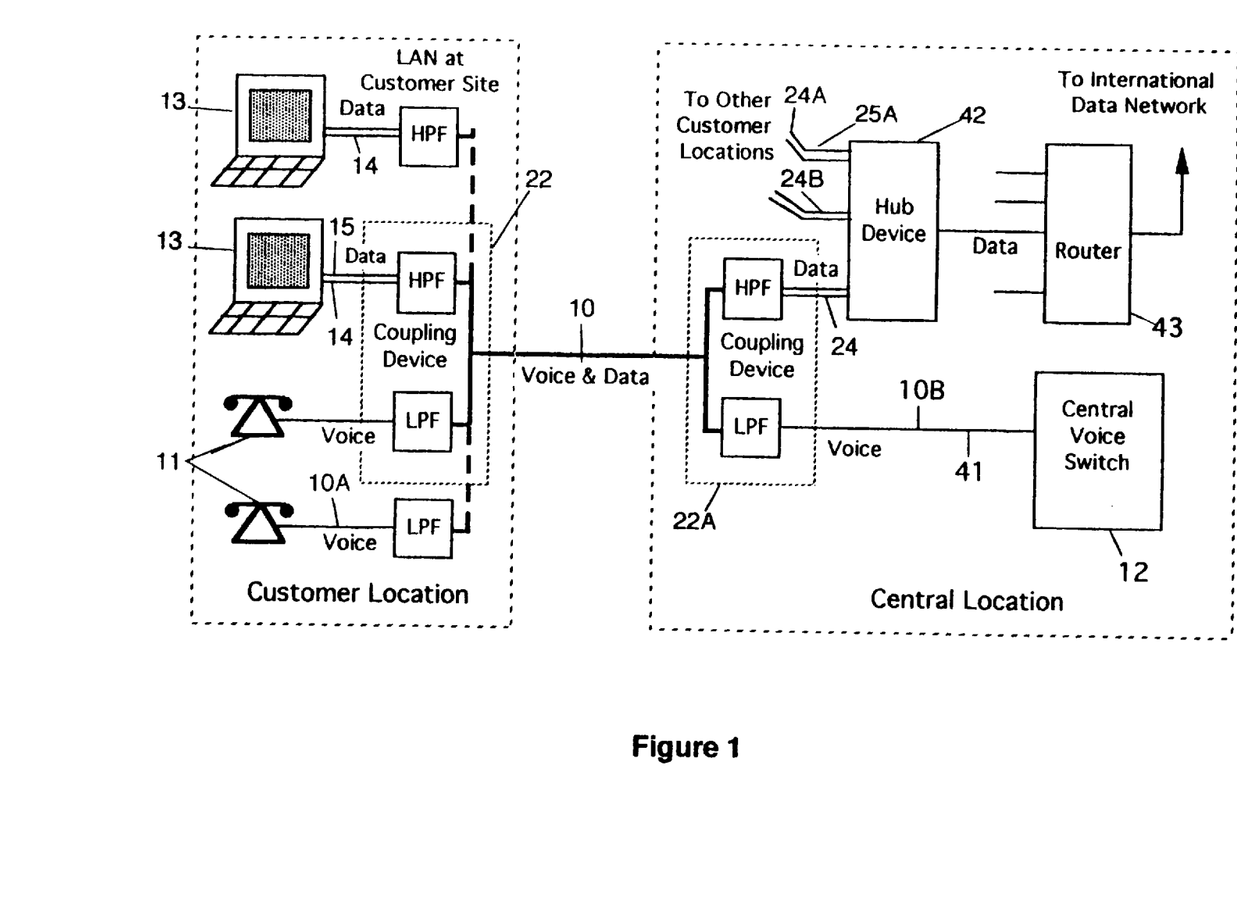
FIG. 1 is a schematic first illustration of a network for simultaneous communication of data and voice on a common telephone line.

The network shown in FIG. 1 comprises a common telephone line 10 forming part of a conventional telephone network. The telephone line 10 can comprise a conventional pair of wires known as tip and ring conductors or can include other communication links conventionally used in the telephone network.

The network further includes a further conventional voice telephone set 11 for attachment to the common line 10 for communication of voice messages therealong using the microphone and loudspeaker arrangements of the conventional voice telephone set 11. The network further includes a central switching system 12 which forms part of the conventional voice communication network and actuates a switching process to connect the line 10 via a line 41 to other lines for communication to a selected addressee as identified by the conventional dialing pulses or tones generated by the voice telephone set 11. The details of the central voice switch 12 will not be described here as they are well known to one skilled in the art. The central voice switch 12 is located at the central location which is generally a local exchange.

As is well known the communications from the voice telephone set are limited to transmissions less than 4000 Hz and preferably in the range 300 to 3400 Hz with little or no communication outside of these frequencies. These frequencies, as is well known, provide sufficient communication of signal to allow the listener to aurally decode and determine the voice communications transmitted. The pulses and tones which are used for switching also lie in the frequency range less than 4000 Hz.

Figure 4:
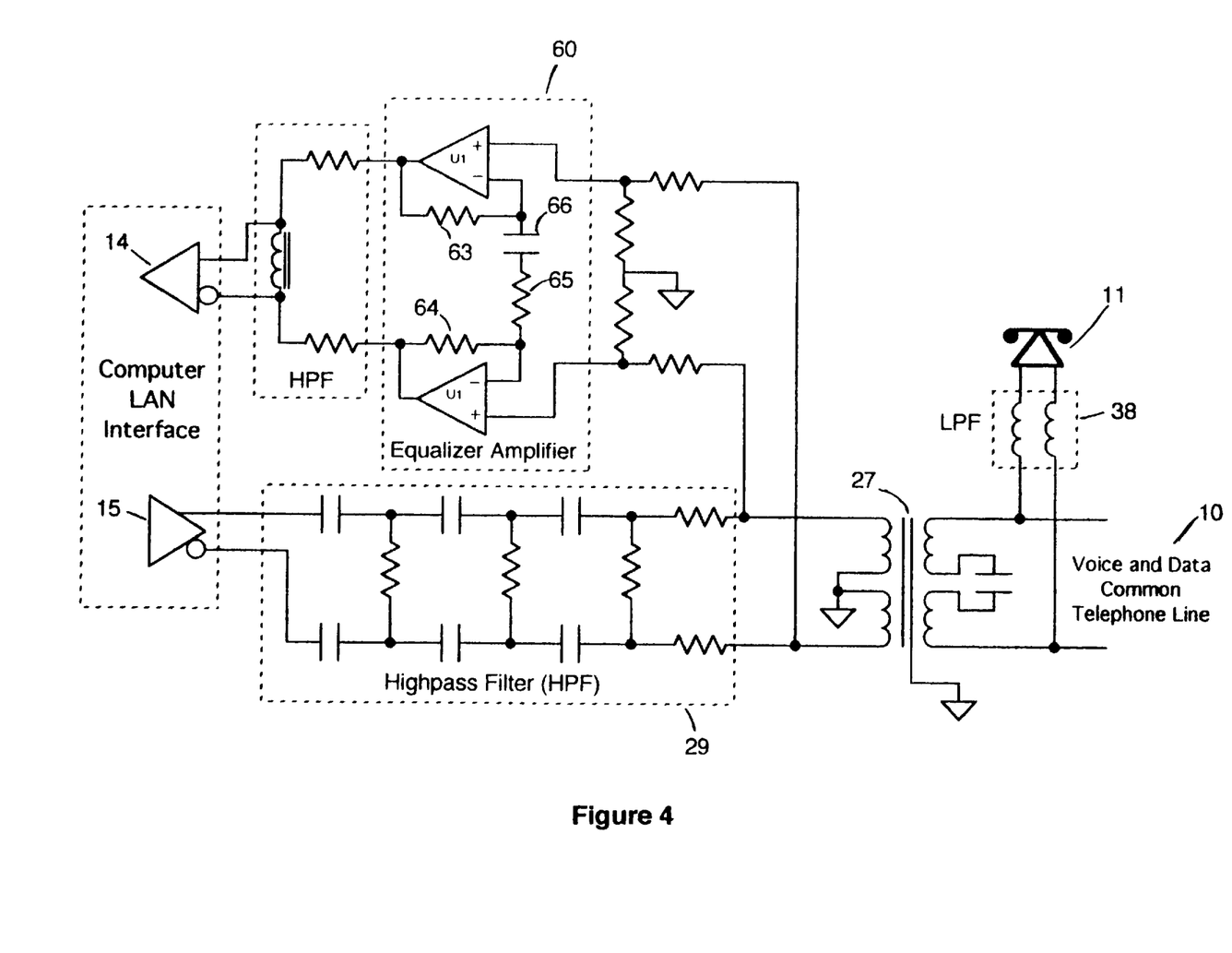
FIG. 4 is a schematic illustration, similar to that of FIG. 2, of a modified coupling device of FIG. 1 which effects transmission of the data to the common telephone line using an equalization amplifier.

A conventional personal computer is indicated at 13 and includes, as is conventional, a LAN interface which includes a receiving terminal 14 and a transmission terminal 15 for transmitting data. The form of the data is that shown in FIG. 6 and comprises a series of pulse elements which indicate either binary "0" or binary "1". As shown in FIG. 4, the pulses are generated so that the pulses indicating binary "0" have a time period which is double that of the binary "1" so that the binary "0" can be designated either by a negative pulse or by a positive pulse of a pulse width equal to the pulse element period. Binary "1" is designated by a pulse element which, in the same pulse period, includes both a positive and a negative pulse. As shown the binary "1" pulses can commence with a positive pulse and follow with a negative pulse or vice versa. The pulses are generated in a train of pulses with no zero current portions between the pulses. As shown in FIG. 1, additional computers can be connected through coupling devices through the telephone line to form a LAN at the remote site.

Figure 6:
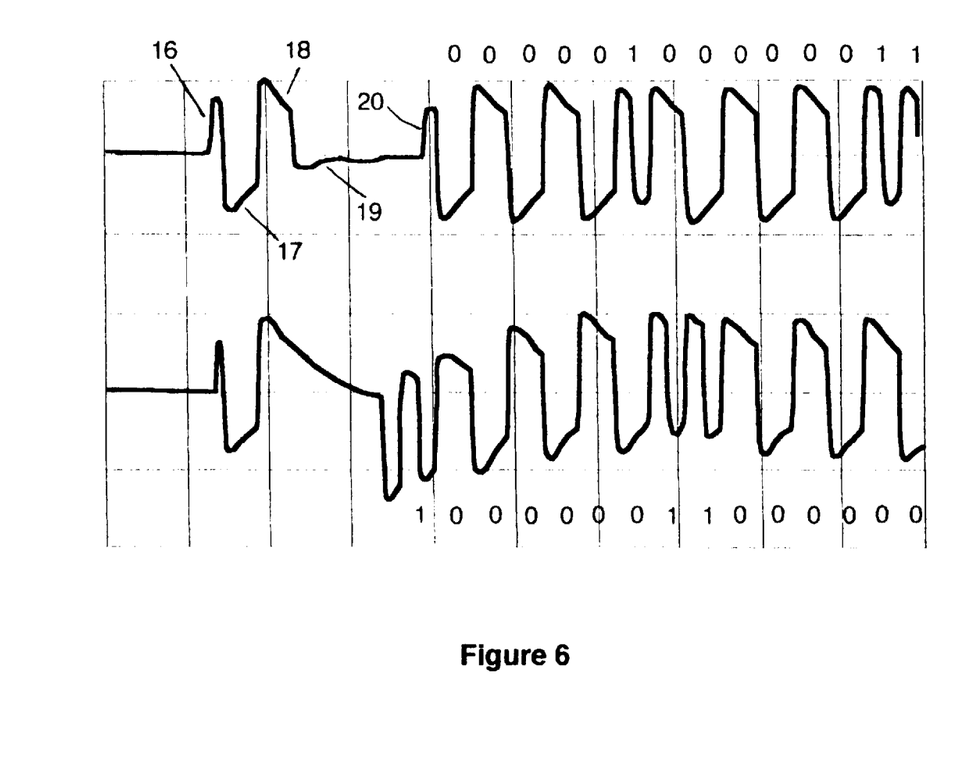
FIG. 6 is a diagram showing the output of the LAN interface of a computer.

On commencing transmission, the output of the computer initially provides a pulse or two pulses 17 and 18 which is then followed by a silent period during which no data is transmitted as indicated at 19. The initial pulses are used to provide a preliminary communication on the line for purposes of avoiding conflict with communications from other terminals on the line. In the event that the initial pulses are not properly received and returned due to interference from other communications on the line, the terminal ceases communication and repeats the communication after a delay period.

At the end of the quiescent period 19, the transmitter may generate a partial pulse 20 and then generates a series of pulses as previously described, the time period or frequency of which determines the binary value.

The pulses are generated at a predetermined frequency of the pulse elements. For the LAN of an Apple Macintosh computer, as used in the LocalTalk protocol with which the present invention is particularly concerned, the frequency is 230 kHz providing a communication of data at a rate of 230 kb/s. The Apple Macintosh interface using the frequency of 230 kHz provides a transmission path length of the order of 2 kilometers (1.25 miles) in a practical system and this is reasonable for use with the conventional telephone switching system as described above so that the distance from the voice telephone set to the central switching unit must be less than this distance to ensure proper communication.

FIG. 6 indicates the pulse is generated by two separate computer terminals to show a variation which can occur between different equipment. The pulses are nominally generated as square waves but due to the high pass filter, the observed wave form at the common line 10 is distorted as shown in FIG. 6.

The commonly used LAN interface of the IBM or IBM compatible personal computer is known as Ethernet and operates at 10 Mb/s. As the degeneration of signals on the transmission system is proportional to the square of the frequency, the maximum Ethernet transmission distance is relatively short and hence from a practical point of view is unsatisfactory for use in the present system. It is however possible to use the Apple Localtalk protocol in an IBM type computer and hence this protocol is available and widely used and provides an effective communication protocol for use in the present invention.

The data transmission signals as described above have been found by analysis to contain frequency components lying in the voice frequency range. The transmission occurs in bursts and, while the frequency of the transmitted signal is nominally 230 kHz, each burst is slightly unbalanced and thus has a net charge. Each burst may have either positive or negative net charge and the sequence of bursts has an envelope with frequency components in the voice range.

Figure 2:
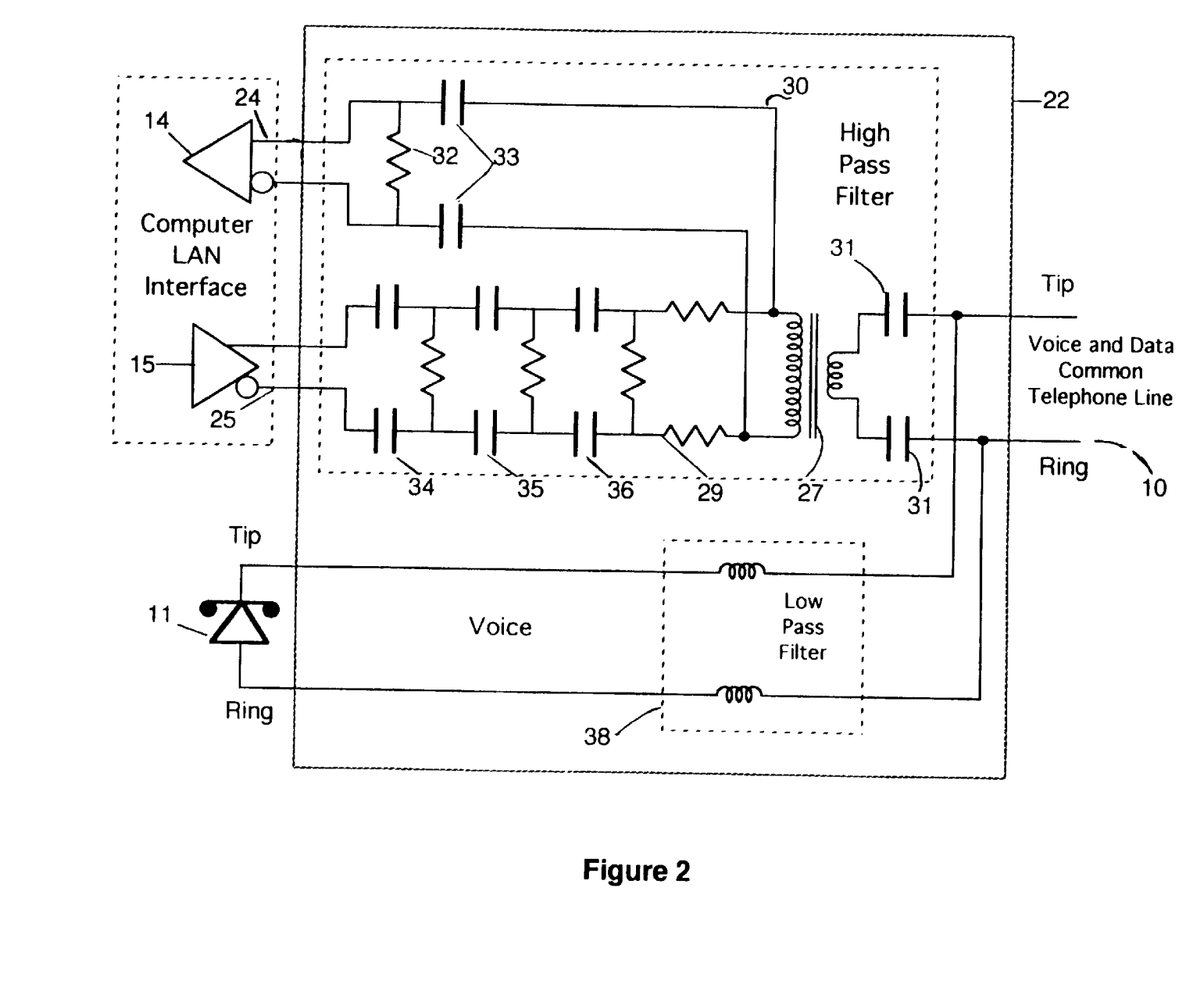
FIG. 2 is a schematic illustration of the coupling device of FIG. 1 which effects transmission of the data to the common telephone line without use of a modulator or an amplifier.

The LAN interface of the computer terminal and the voice telephone set are both connected to a coupling device 22 the schematic arrangement of which is shown in FIG. 2. The coupling device includes terminals 23 for connection to the tip and ring conductors of the common telephone line 10. The coupling device further includes receive terminals 24 for connection to the input 14 of the LAN interface. The coupling device further includes a terminal 25 for connection to the output 15 of the LAN interface.

In FIG. 1, the computers at the remote site or customer location are interconnected by lines which are connected to the telephone line and form part of the telephone line. Thus each computer includes its own high pass filter which is directly connected to the LAN interface of the computer and that high pass filter is then connected to a jack outlet of the extension lines within a building. Thus the customer location includes a LAN arrangement within the customer location and there is no necessity for communication from one computer to the next to be effected through the central location.

Figure 3:
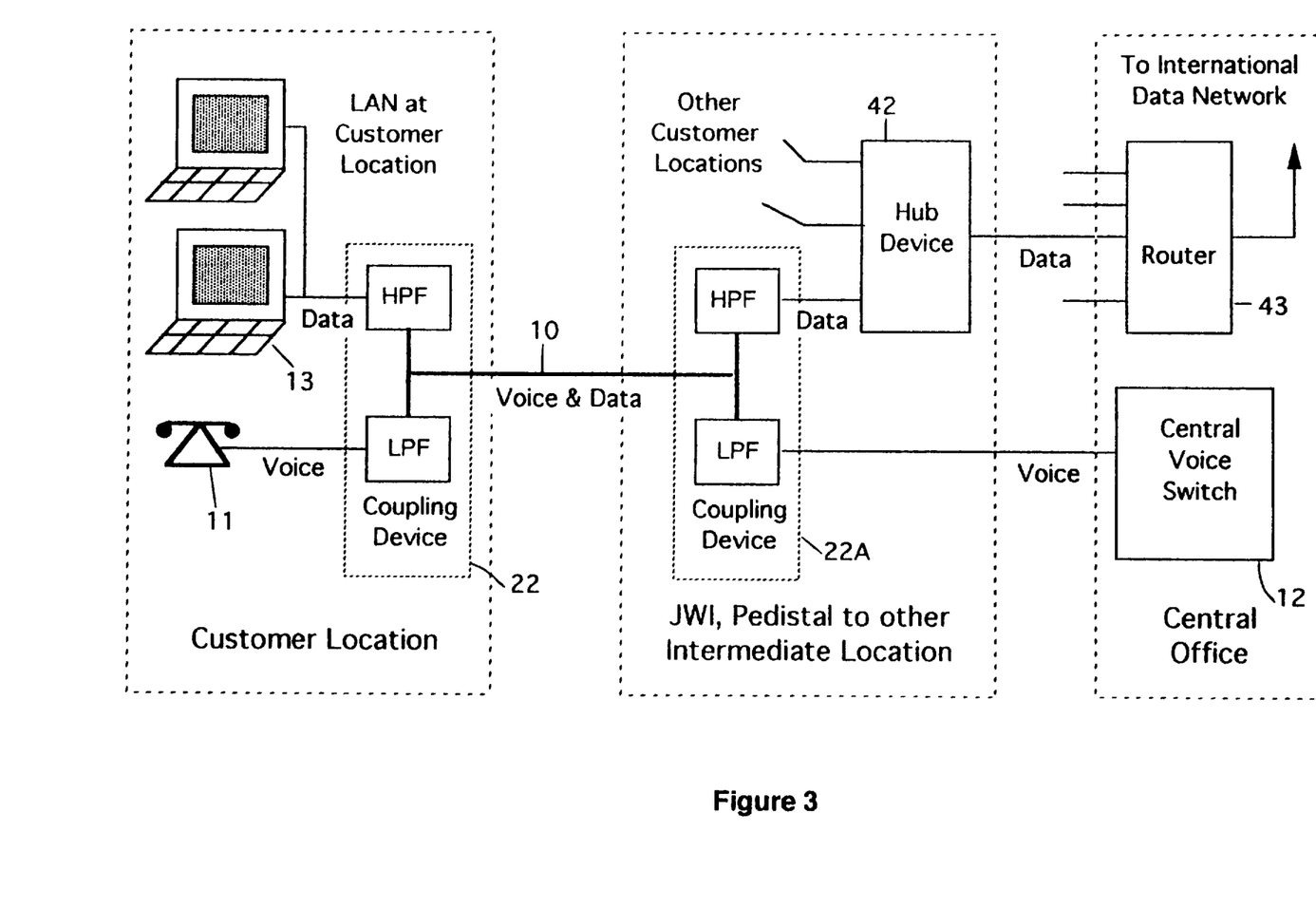
FIG. 3 is a schematic illustration of a second network for simultaneous communication of voice and data on a common telephone line.

In FIG. 3, an alternative arrangement is shown in which there is a single coupling device which is connected to the common telephone line at an entrance into the building and the LAN at a common customer location is in effect defined by a data bus to which each of the computers is connected but the data bus being connected to the high pass filter of the coupling device.

In both arrangements the computers at the customer location are connected to form the LAN at the customer location without the necessity for communication between the computers being directed through the common telephone line to the central location.

The terminals 23 are connected to one side 26 of a transformer 27 with the second side 28 of the transformer connected through a first filter path 29 to the terminals 25 and a second filter path 30 to the terminals 24. The transformer is connected to the terminals 23 through a pair of capacitors 31. This arrangement prevents the communication of DC current from the telephone line 10 to the LAN interface. The transformer can have equal windings but is more preferably a step down transformer which acts to reduce the peak to peak voltage of the LAN signals from the transmitter 15 to the telephone line. The peak to peak voltage of the LAN interface is generally of the order of 8 volts and hence a step down transformer of the order of 8:1 is preferred to provide a peak to peak voltage on the telephone line which is roughly equivalent to the peak to peak voltage of the voice communications.

Both of the filter stages 29 and 30 are comprised of resistor and capacitor elements arranged in a pattern to provide one or more filter stages. Thus the filter path 30 is formed of a single stage defined by a resistor 32 and two capacitors 33. The capacitors are connected to the side 28 of the transformer. The arrangement of filter stages is of course a known arrangement for providing a filter effect. The filter stage 30 is arranged to effect a high pass filter which attenuates the communication of voice frequency signals that is signals having a frequency less than 4 kHz to the receiving terminals of the LAN interface to an amplitude which is less than that which would interfere with the receiving and decoding of the transmitted data.

The filter path 29 includes three filter stages 34, 35 and 36 each of which is similar to the filter stage of the path 30 except that the values of the resistors and capacitors are varied to provide a staged filtration effect. Several stages of resistor and capacitor filter elements are used in the transmission filter stage and the impedance values of the resistors are progressively higher in each successive stage from the output terminal 15 of the LAN interface to the transformer and from the transformer toward the input terminal of the LAN interface so that each successive filter stage imposes relative little loading on the previous filter stage. Again the output of the filter stage 36 is communicated through coupling resistors 37 to the side 28 of the transformer.

Figure 7:
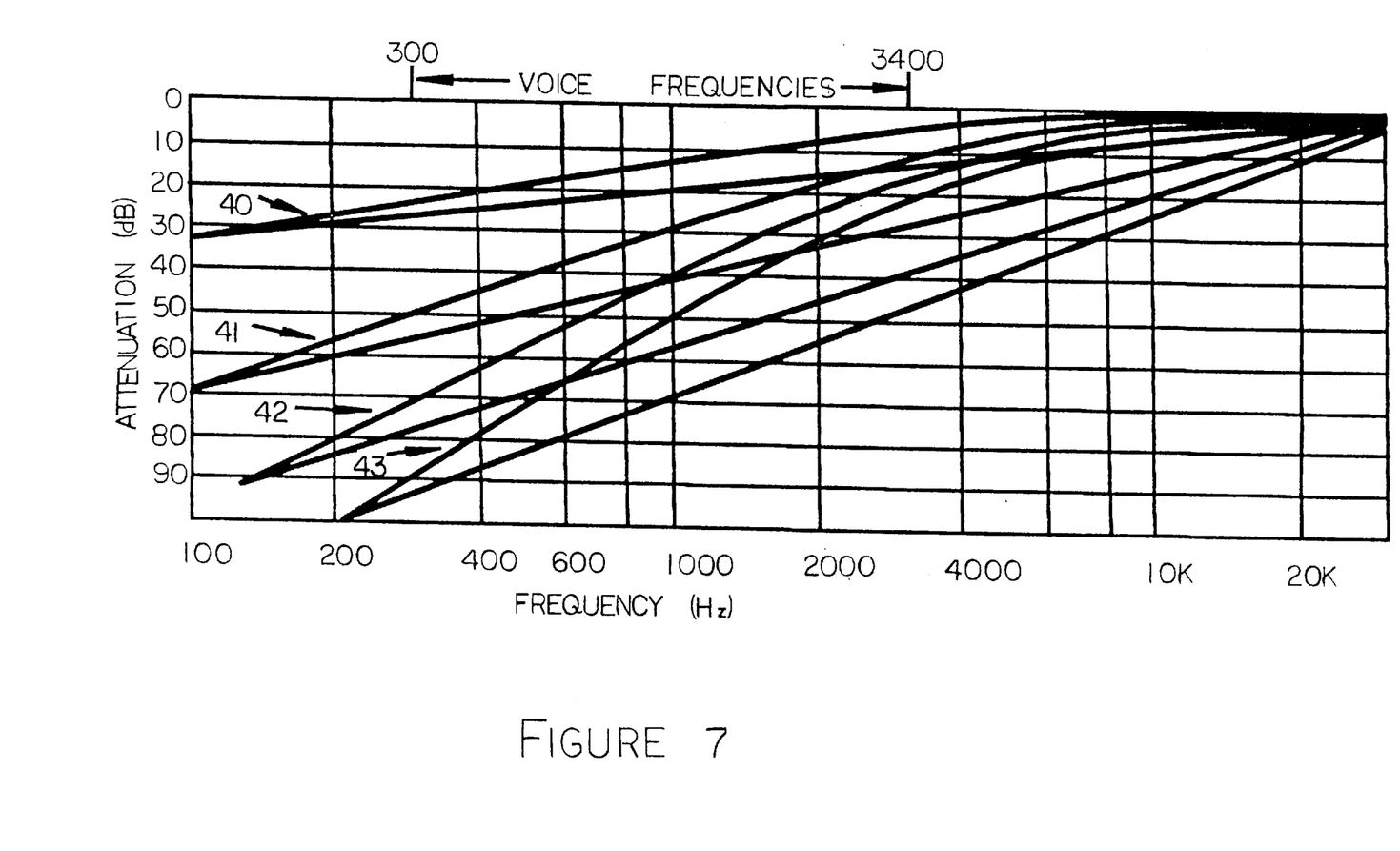
FIG. 7 is a graph of attenuation versus frequency for various components of the transmitter filter part of the high pass filter of FIG. 2.

The relative effects of the various filter stages are shown in the graph of FIG. 7. Thus the first line on the graph which is indicated at 40 provides relatively low attenuation particularly at the lower frequencies. The second line indicated at 41 includes the addition of the second filter stage 35 and provides an improved level of attenuation. The third line indicated at 42 includes the third filter stage which provides a yet further improvement in attenuation. The final line indicated at 43 provides a best attenuation at the lower frequencies and comprises the three filter stages together with the transformer 28.

The coupling device 22 further includes a low pass filter section 38 which is connected to the telephone line at the terminals 23. The low pass filter section is connected by a terminal 40 to the voice telephone set 11. The low pass filter is formed similarly from a capacitor and resistor filter stage with the values of the elements shown on the drawing. The low pass filter requires only to be a single stage since the single stage can readily filter out the larger components of the data signal which are in the frequency range 50 kHz to 400 kHz. The low pass filter therefore primarily passes frequencies below 10 kHz which is of course sufficient to communicate all of the voice communications to the voice telephone set 11.

It will be noted therefore that the receive filter stage 30 of the data signals and the low pass filter 38 are both single stage filters since these can make a relatively course cut to extract only the voice signals for the terminals 40 and only the data signals for the terminals 24.

The bigger problem arises with the data signals and particularly the fact that the data signals carry a low frequency component which would otherwise enter onto the telephone line and be communicated to the voice telephone set to interfere with the voice telephone communications. As the low frequency components can be of the order of 1 kHz, if this component were allowed onto the telephone line, it would provide a signal in the voice frequency range which would prevent or seriously inhibit oral decoding of the signal by the ear of the recipient.

The transformer 27 assists with the filtration stage of the high pass filter and also is used to step down the peak to peak voltage of the data signals for transmission and to step up the peak to peak voltages received from the telephone line for reception at the LAN interface.

At the central location or switching exchange at the central end of the telephone line 10 is provided a further coupling device 22A which is identical to the coupling device 22. The coupling device includes the terminals 24 and 25 for emitting and receiving the data signals passing through the high pass filter section. The coupling device further includes the terminal 40 which is arranged for communication of the voice signals on a voice line 41 for communication to the central voice switch 13. At the central location therefore in a similar manner to the customer location the data signals are extracted by the coupling device and transmitted to the connections 24 and 25 and the voice signals are extracted and transmitted separated from the data signals on the voice line 41.

The data signals on the lines 24 and 25 are connected to a hub device 42 which is arranged for connection to a plurality of customer locations by connections 24A, 25A and 24B, 25B et seq. The hub device therefore forms a central hub multiplexer into which data is supplied and transmitted from a plurality of customer locations. The hub device is of a conventional nature and accordingly the details will not be described herein. The hub device connects to a router 43 which communicates the data to the international data network or Internet. It will be noted therefore that the data signals are extracted from the common telephone system at the central location and are, at that location, transmitted through a separate system of a conventional nature into the central data network. The present invention makes use of the common voice and data telephone line 10 from the customer location to the central location where the hub device and its associated communication equipment can be provided. There is however no necessity for a specific data transmission line from the central location to the customer location and there is no necessity for separating the times of transmission of the voice and data since these can be transmitted simultaneously due to the arrangement of the present invention.

The central hub multiplexer does not act as a data bus since there is no connection between the lines 24, 24A, 24B at the hub. The hub does therefore not form part of a LAN since the LAN of the computers is provided by the data connections at the customer location. It is normally undesirable to have a direct LAN connection between different customer locations.

In the example shown in FIG. 1, the transmission along the common telephone line is effected without amplification of the signals either prior to or subsequent to transmission along the line. This arrangement is satisfactory up to certain distances. However it is well known that the transmission line provides a frequency dependent degradation of the signal so that the high frequencies are degraded more than lower frequencies. In terms of the pulse as received, this high frequency degradation acts to reduce the amplitude of the pulse at the leading edge and to degrade the leading edge itself from the nominal square wave shape.

In order to overcome this degradation, in a first arrangement shown FIG. 4, an equalizer amplifier 60 is provided which is frequency dependent so that it amplifies higher frequencies at a greater gain than lower frequencies thus restoring the high frequencies lost in transmission and thus restoring the nominal square shape of the pulse.

The low frequency gain of the equalizing amplifier is unity and the high frequency gain of the amplifier is determined by the ratio of resistors 63 plus resistor 64 divided by resistor 65. The transition frequency from the low gain is determined by the capacitor 66 and the resistor 63 plus resistor 64. The transition frequency to the high gain being determined by the capacitor 66 and the resistor 65.

It will be appreciated that the coupling device 22A at the central location is symmetrical to the coupling device shown in FIG. 1 so it includes an equalizing amplifier similar to that shown in FIG. 4 for amplifying the data pulses transmitted to the central location from the remote computer.

Figure 5:
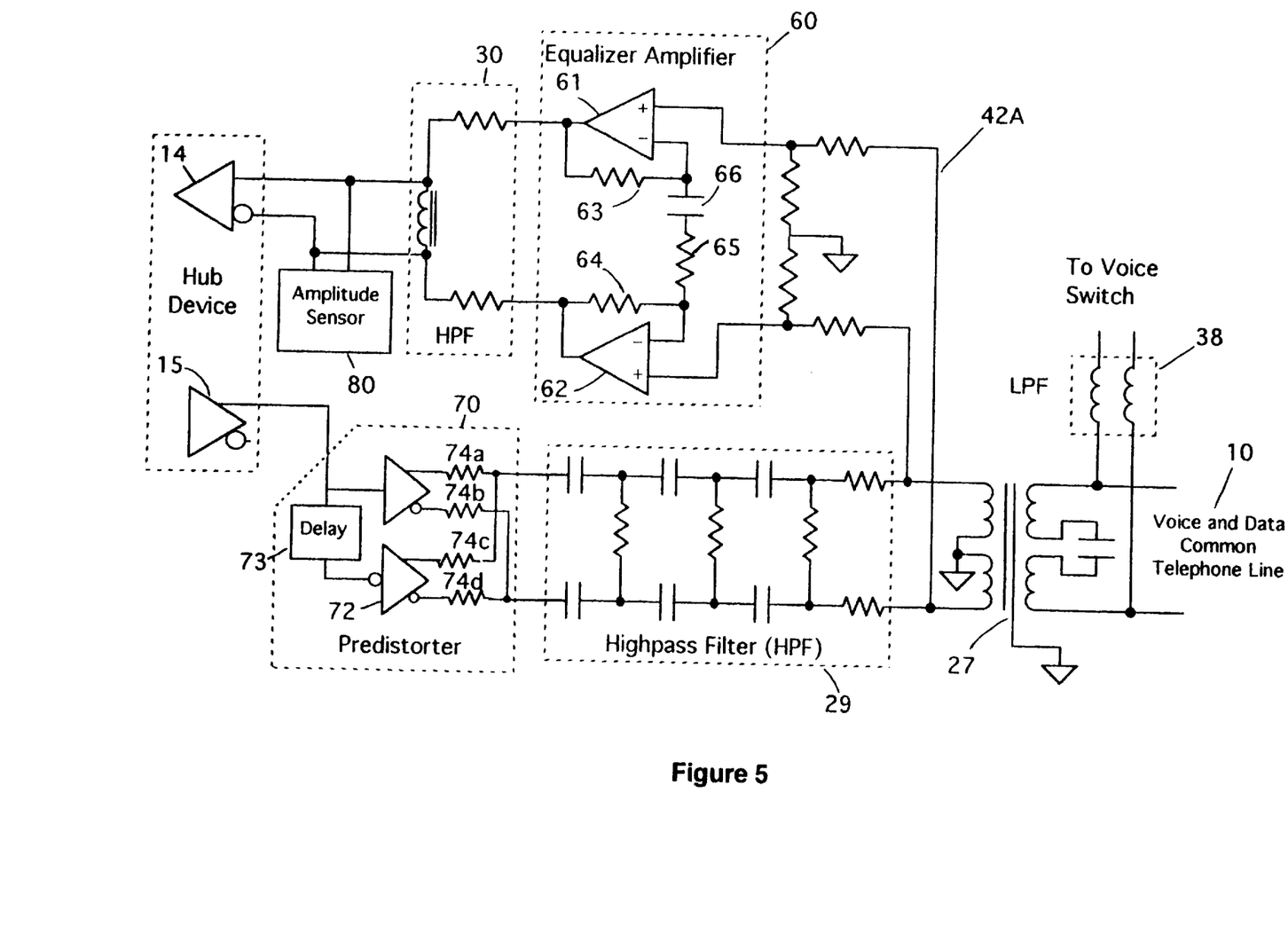
FIG. 5 is a schematic illustration of a predistortion and equalization circuit for use at the central station.

As an alternative for the equalization amplifier, it is also possible to provide a predistortion of the signal prior to transmission and arrangement of this type is shown in the predistorter unit of FIG. 5. The predistortion circuit therefore acts to increase the high frequencies and thus increase the amplitude of the pulse at the leading edge so that the degradation caused by the transmission line acts to degrade the signal back to the nominal square shape which is required. One technique for effecting this predistortion is shown in U.S. Pat. No. 3,980,826 and therefore detailed description is not required herein. However in general, the predistortion technique used generates a delayed version of the normal pulse which is approximately ¼ of the pulse period delayed relative to the normal pulse. The delayed pulse is then subtracted from the normal pulse to generate the required predistorted pulse for transmission. In the predistorter unit of FIG. 5, the normal pulse is delayed by shift register 73 and the negative delayed pulse is formed by amplifier 72. The normal pulse from amplifier 71 is then added to the negative delayed pulse using resistors 74 to form the predistorted pulse.

As a yet further alternative, in order to obtain yet further increase in transmission distance, the circuit can include an equalization amplifier at the receiving end and a predistortion circuit at the transmission end. In effect therefore the techniques used are summated so that a predistorted signal is transmitted, a degraded signal is received and is amplified to return the required shape.

In a yet further arrangement shown in FIG. 5, the equalization amplifier is omitted at the customer location and the central location includes an arrangement having both a predistortion circuit and an equalization amplifier. Thus the predistortion circuit is arranged at the transmission of the central location so that the signals transmitted are predistorted thus avoiding the necessity for equalization at the customer location. In addition the receiver of the central location includes the equalization amplifier circuit arranged to amplify the signals in a manner to overcome the degradation of the transmission line.

Yet further as shown in FIG. 5 the circuit includes a circuit section arranged to sense the amplitude of a signal from the computer at the customer location and for setting an equalization value in the receiver of the central hub device and a predistortion value in the predistortion circuit of the transmitter of the central hub device.

The central hub device is modified relative to a conventional device of this type in that it includes a unit to compensate for the frequencie dependent loss of the common telephone line. It will of course be appreciated that the length of the line 10 provides an attenuation of the signal which is frequency dependent and dependent upon the distance from the computer location to the central location. The equalization device 42A comprises units 60, 70 and 80 of FIG. 5. It compares the peak voltage or amplitude of the equalized signal relative to a predetermined value using unit 80 and then varies the amount of equalization to compensate for the specific loss in the line being used. The amount of equalization can be adjusted by variation in resistor 65. Furthermore, the equalization device simultaneously provides a similar amount of pre-equalization or pre-distortion in the transmitted signal The amount of predistortion is adjusted by variation in the delay and in the gains of amplifiers 71 and 72. This arrangement thus eliminates the need for equalization at the computer and allows the low cost passive coupling device of FIG. 2 to be used at the customer location. The equalizing device adapts to the length of the line 10 by sensing the received signal and simultaneously applying the appropriate amount of equalization and predistortion.

The arrangement of FIG. 1 provides a suitable technique for simultaneous transmission of the voice and data from the customer locations to the central location provided the distance from the customer location to the central location is less than the above distance of two kilometers which is a practical distance over which the attenuation of the data signals is insufficient to prevent proper reception. However in the event that the distances involved are greater than the above distance, the arrangement of FIG. 3 can be used in which the second coupling device instead of being provided at the central office is instead provided at an intermediate location in the telephone network. The intermediate location can be as shown the conventional pedestal which is provided in the conventional home distribution system where a number of drop lines to homes are interconnected. An alternative location for the second coupling device and its associated hub device can be at the jumper wire interface (JWI) in the residential wiring system. The jumper wire interface is a location into which the signals from a plurality of pedestals are interconnected. A yet further alternative is in the wiring closet of a large building. The wiring closet in effect provides the same function as the pedestal or JWI in the residential wiring but in the large building situation.

It is conventional that there is no switching equipment in the pedestal or JWI since there is no power available in this area. The hub device requires power and this is most conveniently supplied through the copper telephone lines coming from the central office. Since the available power from the telephone lines is not large and the hub device is not in an environmentally controlled location it is advantageous to simplify the hub device and provide the majority of the network functions in the central office router.

In the system of FIG. 3, therefore, the splitting of the voice and data from the common telephone line 10 is effected at a position spaced from the central office following which the voice and data are transmitted separately after splitting on separate dedicated lines. The voice communications are therefore transmitted over a distance to the central voice switching system with that distance in some arrangements being greater than the distance between the customer location and the hub device.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. A communication network for transmitting data and voice communication simultaneously over telephone lines which connect diverse independent residential and business locations to a central location, the network comprising:

a central location;

a plurality of diverse independent customer locations;

a plurality of telephone lines arranged such that each customer location is connected to the central location by a respective one of the telephone lines;

at least some of the customer locations including a computer arranged to generate binary data signals, the computer being connected to the respective telephone line such that the binary data signals from the computer are applied to the respective telephone line for reception and reading at the central location and such that binary data signals are applied from the central location to the respective telephone line for reception and reading at the computer;

each computer having a first highpass filter connected between the computer and the respective telephone line, the first high pass filter being arranged to attenuate energy in said voice frequencies to a level such that the energy does not interfere with the binary data signals from the central hub device to the computer and to attenuate the voice frequency energy in the binary data signals from the computer to the central hub device so that the data signal energy does not interfere with voice communications;

at least some of the customer locations having a voice telephone set with terminals for receiving and transmitting voice communications in the form of a voltage varying at voice frequencies;

each customer location having a second lowpass filter connecting the terminals of the telephone set at the respective customer location to the respective telephone line for transmitting said voice communications to and from the voice telephone set on the respective telephone line with the second lowpass filter being arranged to attenuate energy in a range higher than said voice frequency so as to communicate from said telephone line to said voice telephone set substantially only the voice communication frequencies;

the central location including a voice switching system having a plurality of voice ports for receiving and switching voice communications and a central data hub device having a first connection to a central data network or an international data network and a second multiplex connection to a plurality of data ports, each of the telephone lines being connected to a respective one of the data ports and each of the telephone lines being also connected to a respective one of the voice ports;

the central location including a third lowpass filter between each telephone line and the respective voice port, the third lowpass filter being arranged to attenuate energy in a range higher than said voice frequency so as to communicate from said telephone line to said voice port substantially only the voice communication frequencies;

the central location including a fourth highpass filter between each telephone line and the respective data port, the fourth high pass filter being arranged to attenuate energy in said voice frequencies to a level such that the energy does not interfere with the binary data signals from the to the computer central hub device and to attenuate the voice frequency energy in the binary data signals from the central hub device to the computer so that the data signal energy does not interfere with voice communications;

at least some of the customer locations each including a plurality of voice telephone sets, each telephone set including or having associated therewith a respective second lowpass filter, the plurality of telephone sets at each customer location all connecting directly to the respective single telephone line at the customer location for the purpose of voice communication with each other and through the single telephone line with the voice switching system;

at least some of the customer locations each including a plurality of computers, each computer having associated therewith a respective first high pass filter, the computers at each customer location all connecting directly to the respective single telephone line, such that the single telephone line forms a local area network (LAN) for the plurality of computers at the customer location, by which LAN communication of data between any of the computers at the customer location and the central data hub is effected and by which LAN communication can take place between any two of the computers at the customer location;

and the central data hub device being arranged so as to provide no direct data connection between the telephone lines such that connection of each customer location through the central data hub device to the central data network or International data network is independent of the other customer locations and such that the central data hub device prevents direct communication between computers at different customer sites.

2. The network according to claim 1 wherein each computer has an industry standard LAN interface for transmitting binary data signals directly to and receiving binary data signals directly from other similar computers and wherein each customer location has the first highpass filter directly connecting the LAN interface of each computer to the respective telephone line such that the binary data signals from the computer are applied without further modulation to the respective telephone line for reception and reading at the central location and such that binary data signals are received by the computer without further modulation from the central location.

3. The network according to claim 2 wherein each computer has the industry standard LAN Interface operating at 230 kb/s for transmitting binary data signals directly to and receiving binary data signals directly from other similar computers.

4. The network according to claim 2 wherein each computer has the industry standard LAN Interface operating at 10 Mb/s for transmitting binary data signals directly to and receiving binary data signals directly from other similar computers.

5. The network according to claim 1 wherein for each telephone line all the computers of a customer location and the data port connected to that telephone line have equal status and there is no master station such that communication of data between any two computers at the customer location may be effected without communication through the central location.

6. The network according to claim 1 wherein the central hub device is located at a distance from the voice switching system so that data from the computers of a customer location is transmitted on the telephone line over a distance which is significantly less than the distance that the voice communication of the voice telephone sets of the customer location is transmitted to the voice switching system.

7. The network according to claim 6 including providing the central hub device at a wiring closet of a building, at a jumper wire interface of the telephone line or at a junction point between a trunk cable and a distribution cable.

8. The network according to claim 1 wherein the first highpass filter and the fourth highpass filter each include a transformer arranged to transfer data signal voltages between the computer and the telephone line.

9. The network according to claim 8 wherein the first highpass filter incorporates a split passive multi-stage filter in which the impedance values of resistors thereof are progressively higher in each successive stage from the output terminal of the computer to the telephone line and from the telephone line toward the computer so that each successive filter storage imposes relatively little loading to the previous filter stage.

10. The network according to claim 1 wherein the first and fourth highpass filters each include an equalization amplifier arranged to amplify the binary data signals received from the telephone line with a gain which is increased for high frequencies so as to provide equalization for the frequency dependent attenuation and distortion of the telephone line.

11. The network according to claim 1 wherein the first and fourth high pass filters each include a predistorter circuit arranged to distort the binary data signals for transmission on the telephone line by increasing the amplitude at a leading edge of the signal to compensate for high frequency attenuation on the telephone line so as to provide pre-equalization of the transmitted signals.

12. The network according to claim 1:

wherein the fourth highpass filter at the central hub device includes an equalization amplifier arranged to amplify the binary data signals received from the telephone line with a gain which is increased for high frequencies so as to provide equalization for the frequency dependent attenuation and distortion of the telephone line, wherein the fourth high pass filter includes a predistorter circuit arranged to distort the binary data signals for transmission on the telephone line by increasing the amplification of higher frequencies to compensate for high frequency attenuation on the telephone line so as to provide pre-equalization of the transmitted signals, and wherein the central hub device includes a means for sensing the amplitude and distortion of a signal from a computer at a customer location and includes means for adjusting values in the equalization circuit and the predistortion circuit at the central hub device such that the equalization is provided for the telephone line and no adjustments are required at the plurality of computers at the customer location.

* * * * *